United States Patent [19]
Stephenson, III et al.

[11] Patent Number: 5,502,531
[45] Date of Patent: Mar. 26, 1996

[54] CAMERA WITH EXPOSURE COUNTING MECHANISM

[75] Inventors: Stanley W. Stephenson, III, Spencerport; Tom Seamans, Corfu, both of N.Y.

[73] Assignee: Eastman Kodak Company, Rochester, N.Y.

[21] Appl. No.: 388,932

[22] Filed: Feb. 15, 1995

[51] Int. Cl.$^6$ .................................................. G03B 17/36
[52] U.S. Cl. ........................................... 354/217; 354/213
[58] Field of Search ................................ 354/212, 213, 354/217, 207, 266, 268

[56] References Cited

U.S. PATENT DOCUMENTS

| | | |
|---|---|---|
| 1,620,040 | 3/1927 | Schade . |
| 1,888,134 | 11/1932 | Kunkler . |
| 2,278,342 | 3/1942 | Ziegler . |
| 3,363,528 | 1/1968 | Winkler et al. . |
| 3,722,386 | 3/1973 | Furuta ...................................... 354/217 |
| 4,268,150 | 5/1981 | Chen . |
| 4,707,096 | 11/1987 | Lawther . |

*Primary Examiner*—A. A. Mathews
*Attorney, Agent, or Firm*—Peter J. Bilinski

[57] ABSTRACT

A photographic camera adapted to provide respective visible indications corresponding to successive frames of exposed filmstrip as each one of the frames is exposed includes a counter wheel having a plurality of ratchet teeth about its periphery, the ratchet teeth corresponding to the advance of the filmstrip, a holding lever including a pawl for engaging the ratchet teeth when film is present in the camera and for disengaging the ratchet teeth when film is not present in the camera, and an advancing lever in communication with the camera shutter button for incrementally rotating the counter wheel in response to shutter button actuation.

10 Claims, 1 Drawing Sheet

CAMERA WITH EXPOSURE COUNTING MECHANISM

FIELD OF THE INVENTION

This invention relates to photographic cameras and more particularly to a camera having an improved mechanism for counting exposure frames on photographic film.

BACKGROUND OF THE INVENTION

In known camera systems, a strip of light sensitive emulsion, film, is typically wound onto a spool and enclosed in a light tight cartridge. This film cartridge is inserted into an exposing system of the camera to capture images. The film to be exposed is typically wound out of the cartridge, exposed, and wound onto a take-up spool. During camera operation, the film is moved incrementally from the cartridge to the take-up spool and exposures are made onto a series of light sensitized areas on the film. At the end of the exposure sequence, the film is wound back into the cartridge and removed from the camera.

It is advantageous to track the number of exposures that have been made for a given cartridge. In known 35 mm format systems, a sprocket meters 8 perforations on a film and increments a counter system. These counter systems are typically viewed from the top of the camera and are harder to read than a counter on the back of a camera. The Keystone "LeClic/Easy Shot 400" counts frames on the back of the camera using a worm gear to rotate a spring loaded counter wheel. Opening a film door on the camera releases the worm gear from the counter wheel, and the counter returns to a home position.

In other camera systems, the series of perforations on the film are eliminated or the perforations are used only to delimit each frame. Thus a film counter cannot use sprockets engaging the perforations to count frames of film. In simple mechanical cameras that use delimiting perforations, metering mechanisms typically mechanically inhibit the shutter release button and prevent film advance until the next frame has been advanced into the exposure area of the camera. It is advantageous to implement frame counting from the metering/shuttering actuation. It is also advantageous to display the frame count on the back of the camera.

SUMMARY OF THE INVENTION

The present invention provides a mechanism for counting exposure frames on photographic film in response to shutter button actuation. In addition, the mechanism senses the presence or absence of film in the film passageway to enable or disable counting, and allow the counter to return to a zero position when film is absent.

Specifically there is provided a photographic camera including a camera body and a shutter button moveable relative to the camera body for actuating film exposure, and being of the type wherein a frame counter is adapted to provide respective visible indications corresponding to successive frames of exposed filmstrip as each one of the frames is exposed in a film passageway that leads from a film supply spool to a film take-up spool. The camera is characterized by a counter wheel having a plurality of ratchet teeth about its periphery, the ratchet teeth corresponding to the frames on the filmstrip. A holding lever includes a pawl for engaging the ratchet teeth when film is present in the camera. The holding lever disengages the ratchet teeth when film is not present in the camera. An advancing lever, in communication with the shutter button, incrementally rotates the counter wheel in response to shutter button actuation whereby frame counting is implemented from camera shutter actuation.

These and other features and advantages of the invention will be more fully understood from the following detailed description of the invention taken together with the accompanying drawings.

DETAILED DESCRIPTION OF THE INVENTION

Figure 1:
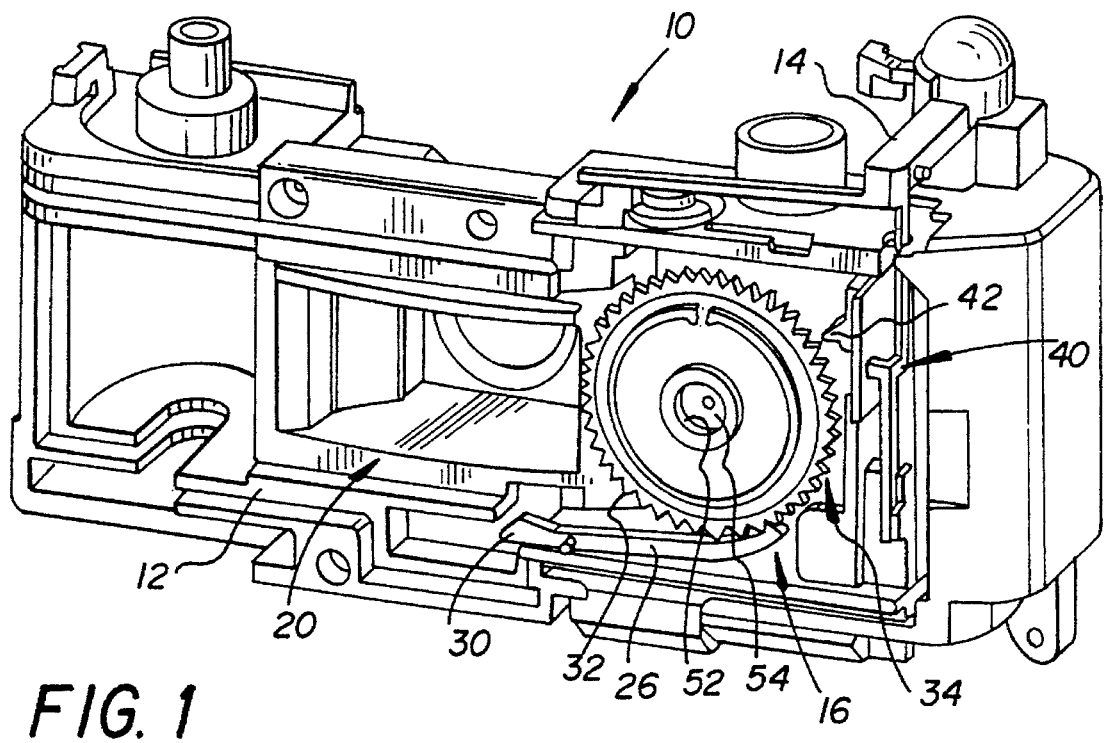
FIG. 1 is a perspective sectional view of a camera body illustrating a mechanism for counting exposure frames on photographic film constructed in accordance with the invention.

Referring now to the drawings in detail, numeral 10 generally indicates a photographic camera. Because the general features of this type of camera are known, the description which follows is directed in particular to the elements forming part of or cooperating directly with the disclosed embodiment. It is understood, however, that other elements not specifically shown or described may take various forms known to persons of ordinary skill in the art.

As shown in FIG. 1, camera 10 includes a camera body 12 and a shutter button 14 moveable relative to the camera body for actuating film exposure as is known. Shutter button 14 is mounted on top of camera 10 and is moveable for upward and downward travel. Shutter button 14 is normally biased in an upward position and is driven downwardly to cause film exposure during picture taking by the finger of an operator or otherwise as is known.

Figure 2:
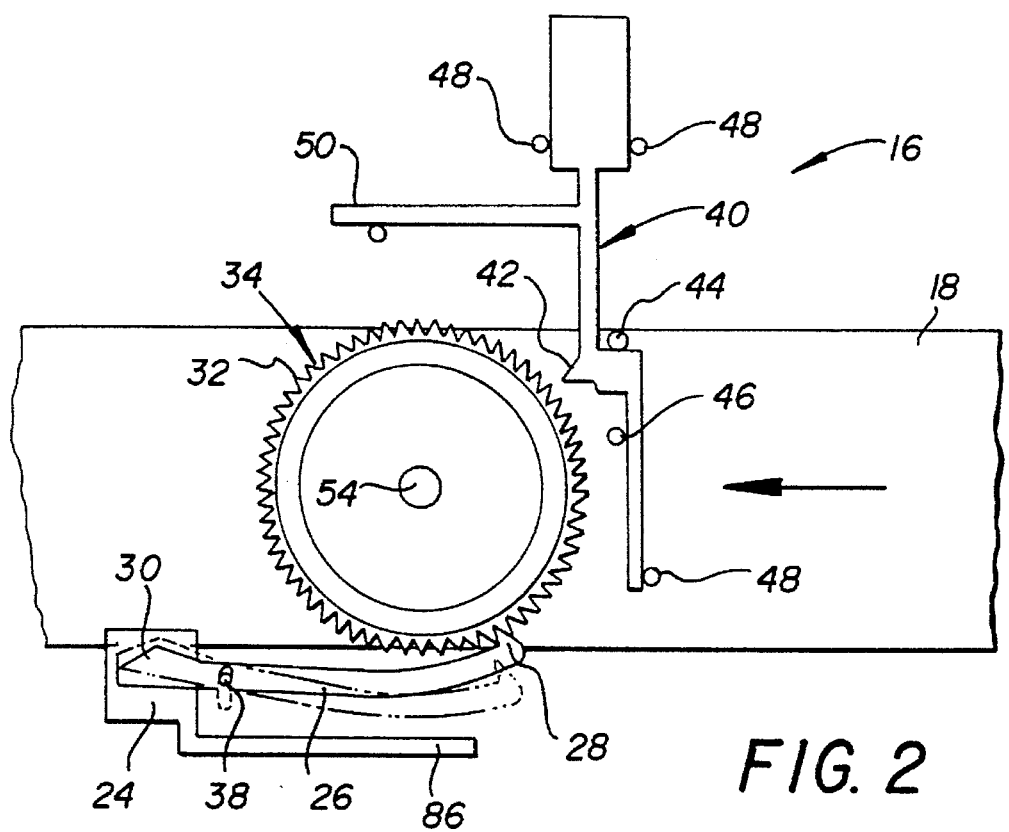
FIG. 2 is an enlarged sectional view of the mechanism of FIG. 1.

Referring to FIGS. 1 and 2, camera 10 includes a frame counting mechanism 16, hereinafter more fully described, adapted to provide respective visible indications corresponding to successive frames of exposed filmstrip 18 as each one of the frames is exposed in a film passageway 20 that leads from a film supply spool (not shown) to a film take-up spool (not shown). Frame counting mechanism 16 counts the exposed frames and displays the frame count on the back of the camera 10.

As illustrated in the drawings, film 18 is directed through film passageway 20 that leads from the supply spool to the take-up spool. The presence of the film 18 is sensed by the mechanism 16 through the access port 24. A holding lever 26 includes a pawl 28 on one end and a film engaging member 30 on the other end that extends through access port 24 and is positioned by the presence of film in passageway 20. Pawl 28 engages ratchet teeth 32 on counter wheel 34 when film 18 is sensed in passageway 20. A spring 36 in engagement with lever 26 normally biases the lever so that the pawl 28 does not engage the teeth 32 on the counter wheel 34. The presence of the film 18 in the passageway 20 rotates the lever 26 about pivot 38 so that the pawl 28 engages the teeth 32 on the counter wheel 34. Upon rewinding of the film 18, pawl 28 is caused to disengage the teeth 32.

Preferably when the film 18 is fed out of the supply spool, the metering mechanism (not shown) inhibits the camera shutter button 14 from being depressed. Likewise when a first frame is ready for exposure, the shutter button 14 is free to be depressed. The downward motion of the shutter button 14 exposes a frame of film. This same motion is now used to incrementally rotate counter wheel 34, being communicated through advancing lever 40.

Advancing lever 40 is preferably formed as a single element. A metering tooth 42 on lever 40 is disposed so that the tooth engages and advances the teeth 32 on the counter wheel 34. An upper stop 44, and lower stop 46, limit the upward and downward travel of lever 40. Lower stop 46 is used to ensure dimensionally that the counter wheel 34 is metered only a single tooth at a time. The location of a series of pins 48 constrains lever 40 to substantially an up and down motion but also allows the lever to bow away from the counter wheel 34 under load. A spring member 50 on lever 40 provides an upward biasing force on lever 40. This upward force homes the lever up against upper stop 44.

Depressing the shutter button 14 moves lever 40 downwardly. The metering tooth 42 on lever 40 engages the teeth 32 on counter wheel 34 and rotates the wheel clockwise a distance determined by the travel of the metering tooth 42 until lower stop 46 is engaged. The travel is designed to be a tooth and a half rotation of the counter wheel 34. The pawl 28 on lever 26 is disposed to slide over the top of the ratchet teeth 32 when counter wheel 34 is rotated clockwise. The downward motion of the shutter button 14 traps the metering tooth 42 on lever 40 between the ratchet teeth 32 and rotates the counter wheel 34. Pawl 28 prevents counter wheel 34 from rotating counter-clockwise to the original position during the upward travel of level 40.

If film 18 is not present in the film passageway 20, then the upward motion of the metering tooth 42 on lever 40 returns the wheel to the original position. In addition, the absence of engagement of pawl 28 ensures that counter wheel 34 is returned to the starting position. This is advantageous because a user can cycle the camera 10 without film 18 to evaluate camera performance.

As described, the metering mechanism prevents the shutter button 14 from moving until the film has been advanced to the next frame. Successive frames are exposed, continuing the clockwise rotation of counter wheel 34. A torsion spring 52 is wound between the counter wheel and an axle 54 through counter wheel 34. Rotation of the wheel 34 winds spring 52. When the film 18 is wound back into the supply spool and releases film engaging member 30, the counter wheel 34 rotates counter-clockwise to the starting position.

The basic mechanism can be used in a variety of ways. The elements can be reworked to provide a counter on top of the camera as become apparent to one skilled in the art. The counter can also be used to count frames that are emerging from the counter. Alternatively, the filmstrip can be wound entirely out of the cartridge and advanced sequentially back into the cartridge. As long as the shutter button is disabled during the prewind, the same mechanism can be used to count frames being put back into the cartridge. Again, when the final length of film is wound into the cartridge, the counter will reset.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

| Parts List | | | |
|---|---|---|---|
| 10. | photographic camera | 34. | counter wheel |
| 12. | camera body | 36. | spring |
| 14. | shutter button | 38. | pivot |
| 16. | counting mechanism | 40. | advancing lever |
| 18. | filmstrip | 42. | metering tooth |
| 20. | film passageway | 44. | upper stop |
| 22. | plate | 46. | lower stop |
| 24. | access port | 48. | pins |
| 26. | holding lever | 50. | spring member |
| 28. | pawl | 52. | torsion spring |
| 30. | film engaging member | 54. | axle |
| 32. | ratchet teeth | | |

What is claimed is:

1. A photographic camera including a camera body and a shutter button moveable relative to the camera body for actuating film exposure, and being of the type wherein a frame counter is adapted to provide respective visible indications corresponding to successive frames of exposed filmstrip as each one of the frames is exposed in a film passageway that leads from a film supply spool to a film take-up spool, the camera characterized by:

a counter wheel having a plurality of ratchet teeth about its periphery; said ratchet teeth corresponding to the advance of said filmstrip;

a holding lever including a pawl for engaging said ratchet teeth when film is present in the camera and for disengaging said ratchet teeth when film is not present in the camera; and an advancing lever in communication with said shutter button for incrementally rotating said counter wheel in response to shutter button actuation.

2. The photographic camera of claim 1 characterized in that said counter wheel is disposed for rotation in a plane parallel to the plane of said film in said film passageway.

3. The photographic camera of claim 2 characterized in that said counter wheel is disposed in the back of said camera.

4. The photographic camera of claim 1 characterized by a spring biasing said holding lever for non-engagement of said pawl and ratchet teeth except in the presence of film in said film passageway.

5. The photographic camera of claim 1 characterized by an upper stop and a lower stop limiting the up and down travel of said advancing lever.

6. The photographic camera of claim 5 characterized by a metering tooth on said advancing lever disposed to engage and advance said ratchet teeth.

7. The photographic camera of claim 6 characterized by a spring biasing said advancing lever upwardly and out of engagement with said counter wheel.

8. The photographic camera of claim 7 characterized in that the upward motion of said metering tooth returns said counter wheel to a starting position if film is not present.

9. The photographic camera of claim 1 characterized in that said shutter button is prevented from being moved until said film has been advanced to the next frame.

10. The photographic camera of claim 1 characterized by an axle through said counter wheel and a torsion spring wound between said counter wheel and axle, wherein rotation of said counter wheel winds said spring, and upon rewinding of said film, said spring returns said counter wheel to a starting position.

\* \* \* \* \*